(12) United States Patent
Kuroda (10) Patent No.: US 9,904,156 B2
(45) Date of Patent: Feb. 27, 2018

(54) PROJECTOR USING AN IMAGE FORMING PANEL

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/590,124

(22) Filed: May 9, 2017

(65) Prior Publication Data
US 2017/0242324 A1 Aug. 24, 2017

Related U.S. Application Data

(63) Continuation of application No. PCT/JP2015/081730, filed on Nov. 11, 2015.

(30) Foreign Application Priority Data

Nov. 27, 2014 (JP) .................................. 2014-239518

(51) Int. Cl.
G03B 21/16 (2006.01)
G03B 21/14 (2006.01)
(Continued)

(52) U.S. Cl.
CPC ............ G03B 21/16 (2013.01); G03B 21/145 (2013.01); G02B 7/022 (2013.01); G02B 7/026 (2013.01);
(Continued)

(58) Field of Classification Search
CPC ...... G03B 21/008; G03B 21/14; G03B 21/16; G03B 21/145; G03B 21/208; G02B 13/16;
(Continued)

(56) References Cited

U.S. PATENT DOCUMENTS

2001/0050758 A1  12/2001  Suzuki et al.
2007/0229770 A1*  10/2007  Miyata ................. G02B 7/1805
                                                                353/33
(Continued)

FOREIGN PATENT DOCUMENTS

JP  2002-207168 A  7/2002
JP  2008-58654 A  3/2008
(Continued)

OTHER PUBLICATIONS

International Search Report for PCT/JP2015/081730 dated Jan. 26, 2016.
(Continued)

Primary Examiner — Sultan Chowdhury
(74) Attorney, Agent, or Firm — Birch, Stewart, Kolasch & Birch, LLP (57) ABSTRACT

A projector 10 includes an image forming panel 14 on which an image is formed, and a projection lens 15 which projects the image of the image forming panel 14 onto a screen 20. The center of the image forming panel 14 is fixed with being shifted in a direction opposite to a direction, in which a central position of a projection surface of the screen 20 is deviated with respect to an optical axis L of the projection lens 15. A lens barrel 31 of the projection lens 15 has an opening 34 as a heat release structure which is formed in a portion of a lens barrel 31 in a direction, in which the image forming panel 14 is shifted, on the image forming panel 14 side from a diaphragm position 32 where an F-Number of the projection lens 15 is determined.

19 Claims, 9 Drawing Sheets

(51) Int. Cl.
G02B 7/02 (2006.01)
H04N 5/74 (2006.01)

(52) U.S. Cl.
CPC ............ *G02B 7/028* (2013.01); *G03B 21/142* (2013.01); *H04N 5/74* (2013.01)

(58) Field of Classification Search
CPC ........ G02B 13/18; G02B 13/20; G02B 13/22; G02B 13/26; G02B 7/022; G02B 7/026; G02B 7/028; H04N 9/317; H04N 9/3141; H04N 9/3144; H04N 9/3152
See application file for complete search history.

(56) References Cited

U.S. PATENT DOCUMENTS

| | | |
|---|---|---|
| 2011/0188007 A1 | 8/2011 | Okura et al. |
| 2012/0162753 A1 | 6/2012 | Tatsuno |
| 2012/0275778 A1* | 11/2012 | Ogasawara ............ G03B 17/02 396/535 |

FOREIGN PATENT DOCUMENTS

| | | |
|---|---|---|
| JP | 2008-58661 A | 3/2008 |
| JP | 2010-243542 A | 10/2010 |
| JP | 2011-164150 A | 8/2011 |
| JP | 2011-209394 A | 10/2011 |
| JP | 2012-137622 A | 7/2012 |

OTHER PUBLICATIONS

Written Opinion of the International Searching Authority for PCT/JP2015/081730 dated Jan. 26, 2016.

* cited by examiner

FIG. 11

PROJECTOR USING AN IMAGE FORMING PANEL

CROSS-REFERENCE TO RELATED APPLICATIONS

This application is a Continuation of PCT International Application No. PCT/JP2015/081730 filed on Nov. 11, 2015, which claims priority under 35 U.S.C § 119(a) to Japanese Patent Application No. 2014-239518 filed on Nov. 27, 2014. Each of the above application(s) is hereby expressly incorporated by reference, in its entirety, into the present application.

BACKGROUND OF THE INVENTION

1. Field of the Invention

The present invention relates to a projector, and in particular, to a fixed shift type projector in which an image forming panel is shifted and fixed.

2. Description of the Related Art

A projector which projects light with an image by a light modulation device (a device which forms an image, and is referred to as an "image forming panel"), such as a liquid crystal display (LCD) or a digital micromirror device (DMD), toward a projection surface (for example, a screen) and displays the image on the screen is known.

In the projector, light (illumination light) emitted from a light source device is given an image according to an image signal (image information) by the image forming panel and is emitted from the projection lens as image light, and the image is projected onto the screen on an enlarged scale. If an optical axis of the projection lens is perpendicular to the screen, the image displayed on the image forming panel is enlarged as it is and projected onto the screen; however, usually, there are many cases where the screen is disposed upward the projector.

In this way, in a case where the screen is disposed with being shifted with respect to the optical axis of the projection lens of the projector, the image forming panel is disposed with being shifted in a direction opposite to a direction in which the screen is shifted with respect to the optical axis of the projection lens, whereby it is possible to project the image displayed on the image forming panel onto the screen as it is on an enlarged scale (fixed shift type projector).

As the projector of the related art, for example, JP2011-209394A describes that heating control of a group of a plurality of lenses provided in a traveling direction of light is performed, thereby eliminating variation of a focal position of a projection optical device with an increase in temperature of a projection lens. JP2010-243542A describes that the inside of a lens barrel including a lens is cooled, thereby cooling an aberration correction lens, suppressing change in aberration of a projection lens due to an increase in temperature, and preventing deterioration of quality of a projected image.

SUMMARY OF THE INVENTION

However, if the image forming panel is shifted in a given direction and the image is projected on the screen, light passes through the image forming panel with being deviated from the center of the optical axis of the projection lens in a direction, in which the image forming panel is shifted. As a result, since an increase in temperature occurs at a position inside the projection lens through which light passes, a difference in temperature occurs between a side (hereinafter, referred to as the lower side of the projection lens) of the projection lens on which the image forming panel is shifted and an opposite side (hereinafter, referred to as the upper side of the projection lens) thereof. If a difference in temperature occurs between the upper side and the lower side of the projection lens, a member holding a lens is deformed, and inclination or displacement occurs in the projection lens (including a part of a plurality of lenses constituting the projection lens). If the projection lens is inclined, optical performance of the projection lens may vary from a design value, and quality of an image projected onto the screen may be degraded.

JP2011-209394A and JP2010-243542A described above describe that, in order to stabilize quality of a projected image, temperature adjustment of the inside of a lens barrel is performed by heating means or cooling means.

However, JP2011-209394A and JP2010-243542A have not studied a difference in temperature in a surface direction (a direction perpendicular to the traveling direction of light) of the projection lens, and have a problem in that it is not possible to prevent inclination or displacement of the projection lens due to the difference in temperature of the surface direction and to suppress degradation of quality of an image to be projected. In particular, in JP2011-209394A and JP2010-243542A, the difference in temperature in the surface direction has not been studied focusing on an individual lens in a group of a plurality of lenses constituting the projection lens.

The invention has been accomplished in consideration of such a situation, and an object of the invention is to provide a projector which has a structure of reducing the difference in temperature between an upper side and a lower side of a projection lens, and prevents inclination or displacement of the projection lens, thereby suppressing degradation of quality of an image to be projected.

In order to attain the above-described object, a projector according to an aspect of the invention comprises an image forming panel on which an image is formed; and a projection lens which projects the image of the image forming panel on a projection surface. The center of the image forming panel is fixed with being shifted with respect to an optical axis of the projection lens, and a central position of the projected image of the image forming panel is deviated in a direction opposite to the direction, in which the center of the image forming panel is shifted. A lens barrel of the projection lens has a heat release structure which is formed in a lens barrel portion in the direction, in which the image forming panel is shifted, on the image forming panel side from a diaphragm position where an F-Number of the projection lens is determined.

Like the projector according to the aspect of the invention, if the center of the image forming panel is shifted in the direction opposite to the direction in which the central position of the projection surface (for example, a screen) is deviated with respect to the optical axis of the projection lens, an optical path through which a ray of light passes in a lens portion of each of a plurality of lenses constituting the projection lens is unevenly distributed in a surface direction (a direction perpendicular to a traveling direction of light) of each lens.

For example, in a case where the projector is placed on a horizontal surface and an image is projected onto a vertical projection surface, light given image by the image forming panel is incident on a lower portion of the projection lens, forms a light diffusing optical path while passing through an upper portion of the projection lens at the diaphragm position as a boundary, and is projected onto the projection surface on an enlarged scale. Then, a difference in temperature occurs in the surface direction (for example, between an upper side and a lower side of a lens) of each lens constituting the projection lens with an increase in temperature of a lens portion, through which light passes, due to the uneven distribution of the optical path. The difference in temperature causes inclination or displacement of the projection lens, and quality of an image to be projected is degraded. In particular, a lens on the image forming panel side from the diaphragm position has a greater difference in temperature between the upper side and the lower side of the lens than a lens positioned on the screen side from a diaphragm where a light diffusing optical path is formed.

In the projector of the aspect of the invention, the lens barrel of the projection lens has the heat release structure which is formed in the lens barrel portion in the direction, in which the image forming panel is shifted, on the image forming panel side from the diaphragm position where the F-Number of the projection lens is determined. With this, even in a fixed shift type projector, since the difference in temperature between an upper side and a lower side of the projection lens hardly occurs, it is possible to prevent inclination or displacement of the projection lens and to suppress degradation of quality of an image to be projected.

As another aspect of the invention, it is preferable that the heat release structure is an opening formed in the lens barrel. Since heat of a lens portion increased in temperature is released outside the lens barrel through the opening, and the lens portion increased in temperature is cooled, the difference in temperature between the upper side and the lower side of the projection lens hardly occurs.

In this case, it is more preferable that the opening has an opening area adjustment mechanism capable of adjusting an opening area. With this, since it is possible to adjust the heat release ability of the heat release structure according to a temperature environment, such as a room where the projector is used, it is possible to control the difference in temperature between the upper side and the lower side of the projection lens with high accuracy.

As another aspect of the invention, it is preferable that the heat release structure is a surface area enlargement portion formed in the lens barrel.

This is another aspect of the heat release structure, and the surface area enlargement portion may have, for example, at least one fin. With this, since heat of a lens portion increased in temperature is released outside the lens barrel through the surface area enlargement portion, and the lens portion increased in temperature is cooled, the difference in temperature between the upper side and the lower side of the projection lens hardly occurs.

As another aspect of the invention, it is preferable that the heat release structure is a heat release material provided in the lens barrel.

This is another aspect of the heat release structure, and since heat of a lens portion increased in temperature is released outside the lens barrel through the heat release material, the difference in temperature between the upper side and the lower side of the projection lens hardly occurs. As the heat release material, for example, heat release rubber, a heat release coating material, heat release ceramics, or the like can be used.

As another aspect of the invention, it is preferable that the heat release structure is a heat sink structure. The heat sink structure is a heat sink using a metal having high thermal conductivity, such as aluminum or copper. Since heat of a lens portion increased in temperature is released outside the lens barrel through the heat sink structure, the difference in temperature between the upper side and the lower side of the projection lens hardly occurs.

As another aspect of the invention, it is preferable that the heat release structure is formed in the lens barrel portion corresponding to a position of a lens having the greatest influence on degradation of lens performance due to the difference in temperature between a direction, in which the center of the image forming panel is shifted, and a direction opposite to the direction, in which the center of the image forming panel is shifted, on the image forming panel side from the diaphragm position where the F-Number is determined, among a plurality of lenses constituting the projection lens.

If the heat release structure is formed at the position of the lens having the greatest influence on degradation of performance with the difference in temperature, it is possible to more effectively suppress degradation of quality of an image to be projected.

The "lens having the greatest influence on degradation of performance" refers to a lens which causes the most variation in the optical characteristics of the projection lens from a design value due to inclination or displacement of a lens among a plurality of lenses.

As another aspect of the invention, it is preferable that a metal ring is used as a spacer between lenses on the image forming panel side from the diaphragm position where the F-Number is determined, and the heat release structure is formed in the corresponding lens barrel portion near the metal ring.

Since the metal ring has high thermal conductivity, the heat release structure is formed in the corresponding lens barrel portion near the metal ring, thereby improving heat release efficiency. In this case, it is preferable that the metal ring and the heat release structure (surface area enlargement portion) with surface area enlargement are in surface contact with each other so as to release heat of the metal ring in the surface area enlargement portion.

As another aspect of the invention, it is preferable that the amount S of shifting the image forming panel is $0.4 \leq S \leq 0.7$.

From when the shift amount S of the image forming panel is the lower limit value of 0.4 of the above-described range, inclination or displacement of the projection lens due to the influence of the difference in temperature in the vertical direction of the lens barrel, that is, between the upper side and the lower side of the projection lens becomes conspicuous. In a case where the shift amount S exceeds the upper limit value of 0.7 of the above-described range, since the shift amount S of the image forming panel becomes excessively large, a lens system becomes large, and manufacturing suitability is degraded. For this reason, the shift amount S of shifting the image forming panel falls within the above-described range, it is possible to provide a high-performance projector with excellent manufacturing suitability while reducing the influence of the difference in temperature between the upper side and the lower side of the projection lens.

As another aspect of the invention, it is preferable that a counterpart heat release structure is formed in a lens barrel portion in a direction opposite to the direction, in which the image forming panel is shifted, in the lens barrel, and the heat release structure is formed in a structure having higher heat release efficiency than that of the counterpart heat release structure.

With this, since it is possible to not only reduce the difference in temperature between the upper side and the lower side of the projection lens but also suppress an increase in temperature of the entire lens, it is possible to more reliably suppress degradation of quality of an image to be projected.

According to the projector of the invention, since the projector has a structure of reducing the difference in temperature between the upper side and the lower side of the projection lens, it is possible to prevent inclination or displacement of the projection lens, and to suppress degradation of quality of an image to be projected.

DESCRIPTION OF THE PREFERRED EMBODIMENTS

Hereinafter, a projector according to the invention will be described referring to the accompanying drawings. It should be noted that, in this specification, the expression "to" is used as a meaning including numerical values before and after the expression as a lower limit value and an upper limit value.

[First Embodiment of Projector of the Invention]

Figure 1:
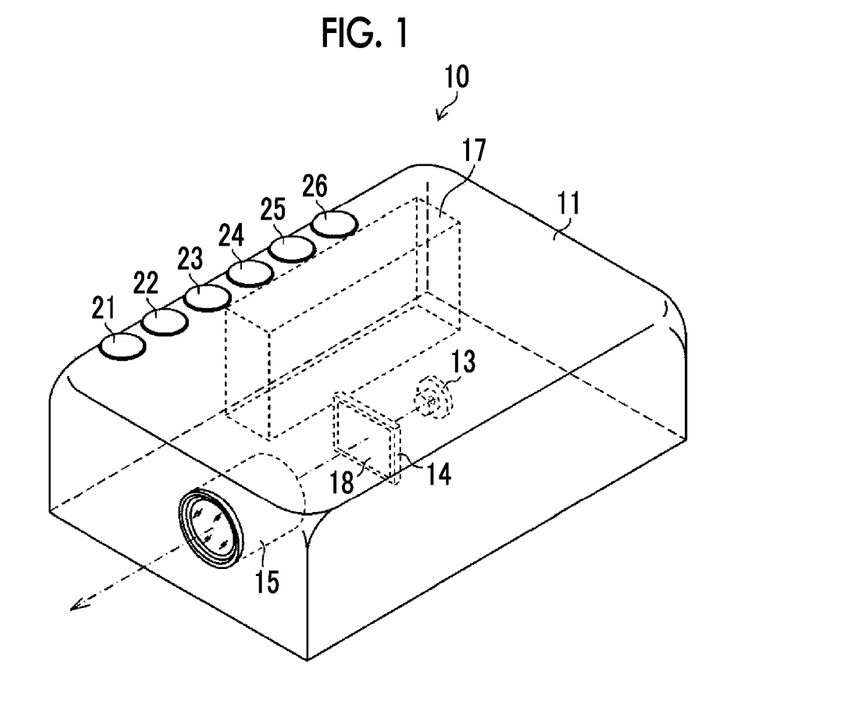
FIG. 1 is a schematic view showing the configuration of a projector of this embodiment.

FIG. 1 is a schematic view showing the configuration of a first embodiment of a projector of the invention. Although a screen, a wall surface, a ceiling surface, or the like is used as a projection surface, in this embodiment, a case where a screen is used as a projection surface will be described below.

A projector 10 of this embodiment has a structure in which a light source device 13, an image forming panel 14, a projection lens 15, and a control device 17 are housed in a housing 11 having a substantially rectangular parallelepiped. On a top surface of the housing 11, a zoom dial 21, a light amount adjustment dial 22, a focus dial 23, an up/down pint adjustment dial (tilt-and-shift operating member) 24, a right/left pint adjustment dial (tilt-and-shift operating member) 25, and a screen correction dial (screen shape correction member) 26 are provided. Light emitted from the light source device 13 is given an image on an image forming surface 18 of the image forming panel 14, is emitted from the projection lens 15, and is projected onto a screen (not shown in FIG. 1 and represented by reference numeral 20 in FIG. 3).

Figure 2:
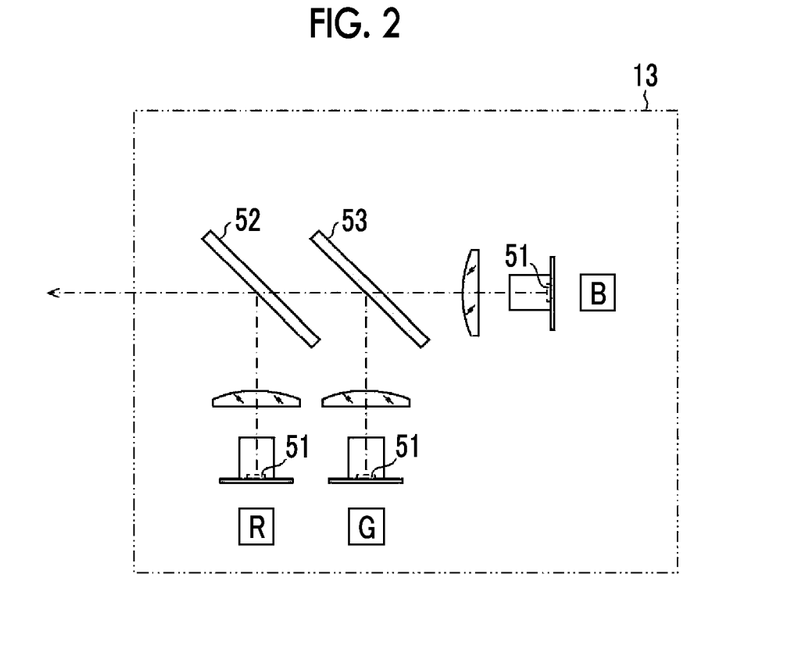
FIG. 2 is a schematic view of a light source device.

As shown in FIG. 2, the light source device 13 has light emitting diodes (LED) 51 which respectively emit light of three colors of RGB. Light emitted from the LED 51 of red (R) is reflected on a dichroic mirror 52, and light emitted from the LED 51 of green (G) is reflected by a dichroic mirror 53 and is transmitted through the dichroic mirror 52. Light emitted from the LED 51 of blue (B) is transmitted through the dichroic mirrors 52 and 53, whereby light of the three colors of RGB is emitted onto the same optical axis.

The control device 17 sequentially displays images of the three colors of RGB on the image forming surface 18, and synchronously emits light respectively from the LEDs 51 of the three colors in conformity with the images of the three colors. The control device 17 receives an operation signal of the zoom dial 21 to adjust the size of an image projected onto the screen 20, or receives an operation signal of the light amount adjustment dial 22 to adjust brightness of an image projected on the screen 20. In addition, the control device 17 operates a focus adjustment mechanism (not shown) of the projection lens 15 with an operation of the focus dial 23 to perform focus adjustment of a central portion of an image projected onto the screen 20. The drive and control of a heating device described below are also controlled by the control device 17.

As the image forming panel 14, a transmissive liquid crystal panel or a digital micromirror device can be used. The light source device 13 is not limited to an LED light source device which sequentially emits light of the three colors of RGB, and may be a light source device which uses a Xenon lamp or a halogen lamp emitting white light, and in this case, a transmissive color liquid crystal panel can be used as the image forming panel 14.

Figure 3:
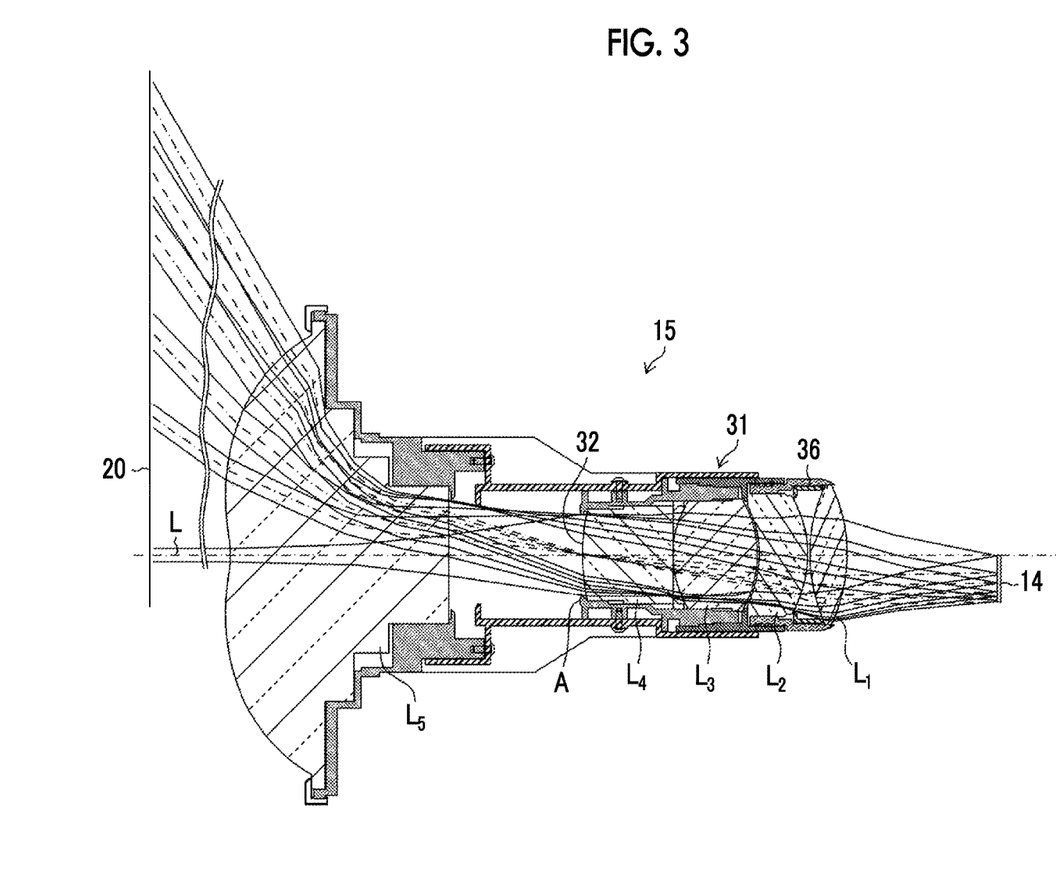
FIG. 3 is a sectional side view showing the configuration of a projection lens of a first embodiment and an optical path of light.
Figure 4:
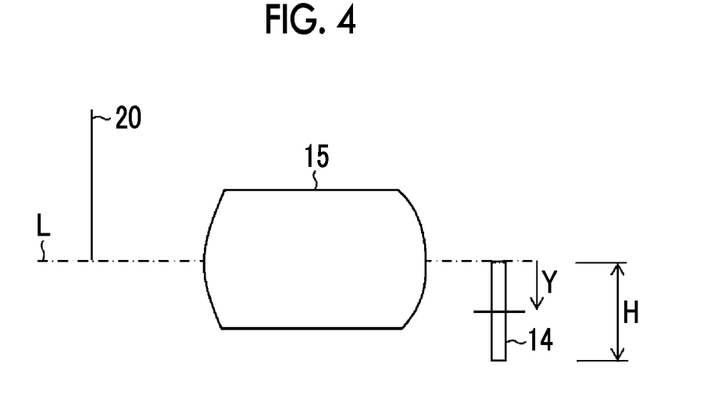
FIG. 4 is an explanatory view illustrating a shift amount of an image forming panel.

FIG. 3 is a sectional side view showing an example of a lens configuration in a fixed shift type projection lens of the invention and an optical path of a light passing through the projection lens. FIG. 4 is an explanatory view illustrating a shift amount of the image forming panel 14.

As shown in FIG. 3, a forming position of an image is a position on the screen 20, and an image is projected on an upper side of FIG. 3 with respect to an optical axis L of the projection lens 15. The center of the image forming panel 14 is fixed with being shifted in a direction opposite to a deviation direction of a central position of the projection surface of the screen 20 with respect to the optical axis L of the projection lens 15, that is, a lower side with respect to the optical axis of the projection lens 15.

As shown in FIG. 4, when Y: the shift amount (distance) from the optical axis L of the projection lens 15 to the center of the image forming panel and H: the length in the shift direction of the image forming panel 14, the amount (shift rate) S of shifting the image forming panel 14 is defined by S=Y/H. That is, when S=0.5, as shown in FIG. 4, this refers to a case where a cross-section of the image forming panel 14 matches the optical axis L of the projection lens 15. When S>0.5 (S is greater than 0.5), an end portion of the image forming panel 14 is shifted in a direction of being separated from the optical axis L of the projection lens 15. In a case where S=0, a layout (arrangement) close to a long-range projection type of the related art is formed in which the center of the image forming panel 14 matches the optical axis L of the projection lens 15. The amount S of shifting the image forming panel 14 is preferably equal to or greater than 0.4 and equal to or less than 0.7 (0.4≤S≤0.7), and more preferably, equal to or greater than 0.45 and equal to or less than 0.6.

From when the shift amount S of the image forming panel 14 is the lower limit value of 0.4 of the above-described range, inclination or displacement of the projection lens 15 due to the influence of the difference in temperature in a vertical direction of a lens barrel 31, that is, between the upper side and the lower side of the projection lens becomes conspicuous. In a case where the shift amount S exceeds the upper limit value of 0.7 of the above-described range, since the shift amount S of the image forming panel 14 becomes excessively large, a lens system becomes large, and manufacturing suitability is degraded. For this reason, the shift amount S of shifting the image forming panel 14 falls within the above-described range, whereby it is possible to provide the high-performance projector 10 with excellent manufacturing suitability while reducing the influence of the difference in temperature between the upper side and the lower side of the projection lens.

As shown in FIG. 3, in this embodiment, the projection lens 15 is constituted of five lenses, and is constituted of, in order from the image forming panel 14 side, a first lens $L_1$ formed of a biconvex lens, a second lens $L_2$ formed of a concavo-convex surface with a concave surface on the screen 20 side, a third lens $L_3$ formed of a biconvex lens, a fourth lens $L_4$ formed of a plano-convex surface with a convex surface on the screen 20 side, and a fifth lens $L_5$ with a convex aspherical surface on the screen 20 side.

A metal ring 36 as a spacer is provided between the first lens $L_1$ and the second lens $L_2$.

On an incidence surface side of the fourth lens $L_4$, a circular aperture diaphragm A which determines an F-Number is provided, and the position of the aperture diaphragm A becomes a diaphragm position 32. Although the aperture diaphragm A of this example is a fixed diaphragm, the invention is not limited thereto, and a variable diaphragm device which determines an F-Number may be provided between the fourth lens $L_4$ and the fifth lens $L_5$. As the variable diaphragm device, a known diaphragm device can be used, and for example, as described in the paragraph <0018> and FIGS. 3 and 4 of JP2011-227472A, a plurality of aperture leaf blades and a sliding plate (movable portion) are held between a lens frame and an aperture plate in a superimposed manner. Since the respective aperture leaf blades are positioned to be pivotally movable on the aperture plate, and the sliding plate is pivoted and the aperture leaf blades are pivoted to enlarge or reduce the aperture diameter of the diaphragm, whereby it is possible to adjust the F-Number.

As shown in FIG. 3, light incident into the projection lens 15 primarily passes through a lower side of the optical axis of the projection lens 15. Then, the passage path of light is reversed at the diaphragm position 32, and light is diffused while primarily passing through an upper side of the projection lens 15 and is projected onto the screen 20 on an enlarged scale. In FIG. 3, the passage path in the projection lens 15 of light passing through each position of the image forming panel 14 is indicated by a solid line, and the center of light is indicated by a one-dot-chain line.

The image forming panel 14 is disposed with being shifted to the lower side, whereby light primarily passes through a direction, in which the image forming panel 14 is shifted, in the projection lens 15, that is, the lower side with respect to the optical axis of the projection lens 15 to the diaphragm position 32 in the projection lens 15. Accordingly, the projection lens 15 in the direction, in which the image forming panel 14 is shifted, is heated with the passage of light, and a difference in temperature occurs in a direction (between the upper side and the lower side of the projection lens) perpendicular to the passage direction of light in the projection lens 15.

If a lens in the projection lens 15 is heated with the passage of light, there is a case where a member holding the lens is deformed by the influence of the temperature. In an area where the passage amount of light is small, there is a small increase in temperature of a lens. With this, a difference in temperature occurs in the vertical direction of the projection lens 15 with respect to the passage direction of light, that is, between the upper side and the lower side of the projection lens. If the difference in temperature is large, deformation due to partial heating in a surface direction of a lens occurs, the lens is inclined, and quality of an image to be formed is degraded. Since the rotation symmetry of the lens collapses due to the inclination of the lens, in addition of degradation of the resolution of an entire image to be formed is degraded, focusing position deviation or the like in a diagonal direction due to the occurrence of a field curvature occurs, resulting in degradation of performance of an entire projected image. In particular, the lenses $L_1$ to $L_4$ on the image forming panel 14 side from the diaphragm position 32 have a greater difference in temperature between an upper side and a lower side of the lens than the lens $L_5$ on the screen 20 side from the diaphragm position 32 where a light diffusing optical path is formed.

Accordingly, in the first embodiment of the projector 10 of the invention, a heat release structure is formed in a portion of the lens barrel 31 in a direction, in which the image forming panel is shifted, on the image forming panel 14 side from the diaphragm position 32 where the F-Number of the projection lens 15 is determined. With this, since it is possible to reduce the difference in temperature between a lens portion where the passage amount of light is large and there is a large increase in temperature and a lens portion where the passage amount of light is small and there is a small increase in temperature, it is possible to further reduce the difference in temperature between the upper side and the lower side of the projection lens.

Therefore, it is possible to prevent inclination or displacement of the projection lens 15, and to suppress degradation of quality of an image to be projected.

Although the heat release structure is not particularly limited as long as a structure is formed in the lens barrel 31 such that heat (thermal) of a lens or heat (thermal) of a lens support member can be released, for example, an opening formed in the lens barrel, a surface area enlargement portion formed in the lens barrel, a heat release material formed in the lens barrel, and a heat sink structure provided in the lens barrel can be suitably employed.

Figure 5A:
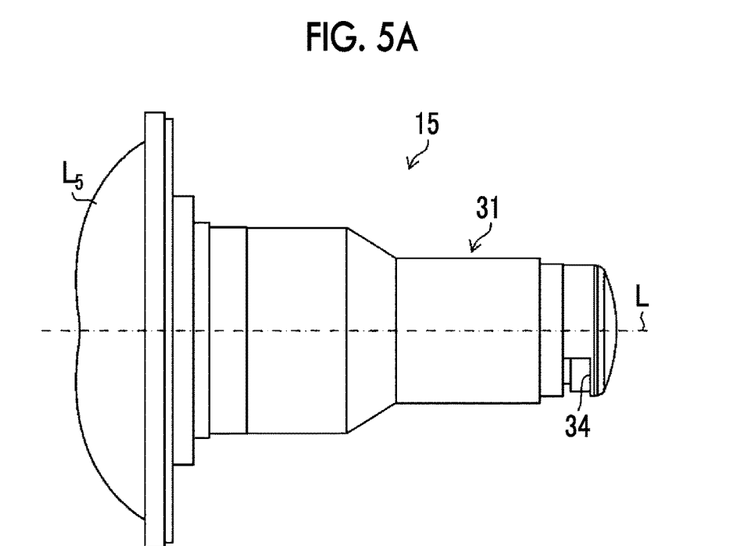
FIGS. 5A and 5B are explanatory views illustrating an opening as a heat release structure formed in a lens barrel in the first embodiment.
Figure 5B:
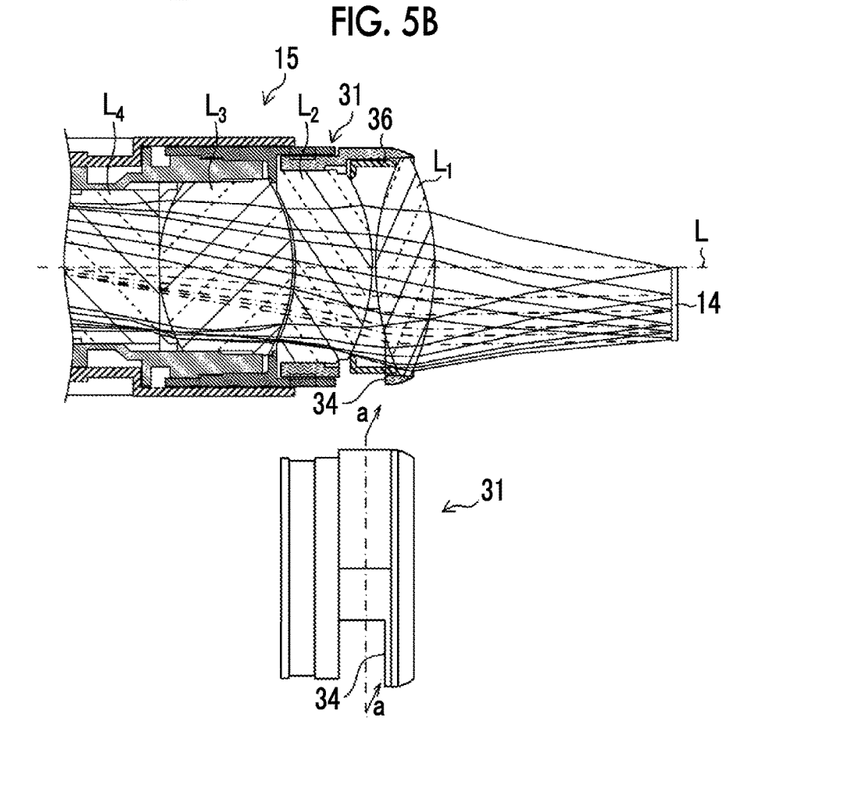

FIGS. 5A and 5B show a case where an opening 34 formed in the lens barrel 31 is used as a heat release structure, FIG. 5A is an appearance diagram of the entire lens barrel 31 of the projection lens 15, and FIG. 5B is a diagram showing the positional relationship between the opening 34 and a lens.

As shown in FIG. 5B, a metal ring 36 is provided as a spacer between the lenses $L_1$ and $L_2$, and the opening 34 is formed in a portion of the lens barrel 31 in the direction, in which the image forming panel 14 is shifted, near the metal ring 36.

With this, heat of the lower portions of the lenses $L_1$ and $L_2$ where the passage amount of light is large and there is a large increase in temperature is easily released through the opening 34, and heat of the upper portions of the lenses $L_1$ and $L_2$ where the passage amount of light is small and there is a small increase in temperature is hardly released. As a result, since the difference in temperature between the lower portions and the upper portions of the lenses $L_1$ and $L_2$ is further reduced, it is possible to prevent inclination or displacement of the projection lens 15, and to suppress degradation of quality of an image to be projected.

As the metal ring 36, a metal ring made of aluminum or copper is preferable used in terms of high thermal conductivity and comparatively low cost.

Figure 6:
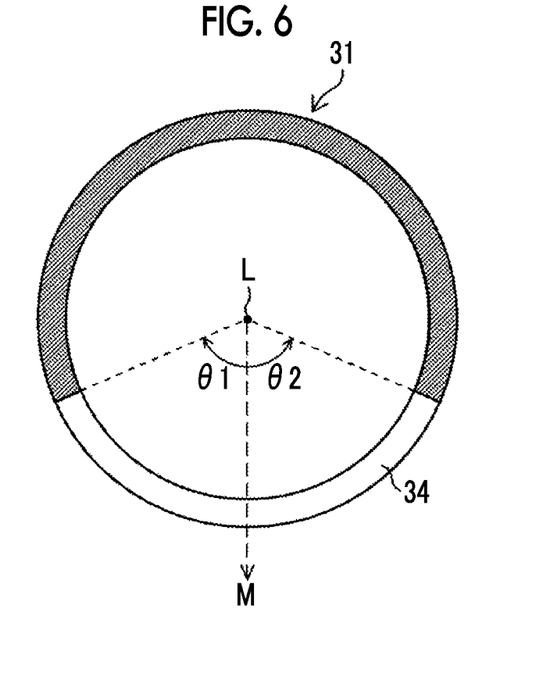
FIG. 6 is an explanatory view illustrating the size of the opening.

FIG. 6 is a sectional view of the lens barrel 31 taken along the line a-a of FIG. 5B, and is a diagram illustrating a forming range of a heat release structure with the example of the opening 34.

As shown in FIG. 6, the forming range of the opening 34 can be expressed as a central angle of the optical axis L in a case where the shift direction of the image forming panel 14 is defined as a reference line M. That is, the forming range of the opening 34 is a range in which the central angle θ (θ1+θ2) of ±100 degrees from the reference line M is made, preferably, a range in which the central angle θ of ±90 degrees is made, and more preferably, a range in which the central angle θ of ±45 degrees is made.

If the forming range of the opening 34 is greater than the range in which the central angle of ±100 from the reference line M is made, there is a concern that the strength of the lens barrel 31 is weakened, and heat of the lower portion of a lens which increases in temperature is not partially released, making it difficult to reduce the difference in temperature between the upper side and the lower side of the projection lens.

In FIG. 6, although the forming range of the opening 34 has been described with the example of the opening 34, the same applies to a case of a heat release structure, such as a surface area enlargement portion, a heat release material, and a heat sink structure described below.

It is preferable the opening 34 has an opening area adjustment mechanism 38 which adjusts an opening area.

Figure 7:
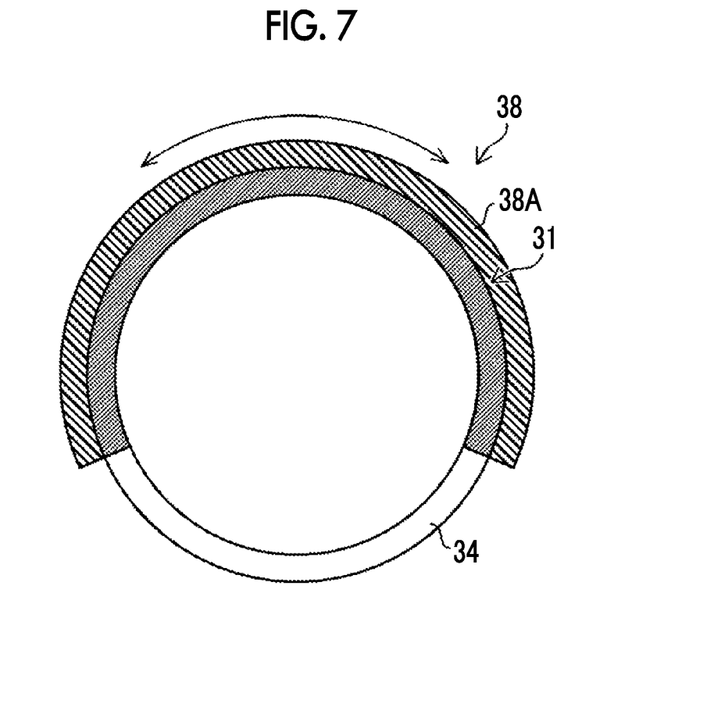
FIG. 7 is an explanatory view illustrating an example of an opening area adjustment mechanism of the opening.

FIG. 7 shows an example of the opening area adjustment mechanism 38, and a circular arc-shaped protection sheath 38A is rotationally movably fitted to the outside of a portion of the lens barrel 31 where the opening 34 is formed. Then, the protection sheath 38A is rotationally moved in a circumferential direction with respect to the lens barrel 31, thereby adjusting the opening area of the opening 34.

In this way, the opening area adjustment mechanism 38 is provided in the opening 34, whereby it is possible to adjust the opening area of the opening 34 according to a temperature of a room or the like where the projector 10 is used. With this, since it is possible to adjust the heat release ability of the opening 34 according to a temperature environment of a room or the like where the projector 10 is used, it is possible to control the difference in temperature between the upper side and the lower side of the projection lens with higher accuracy.

Figure 8A:
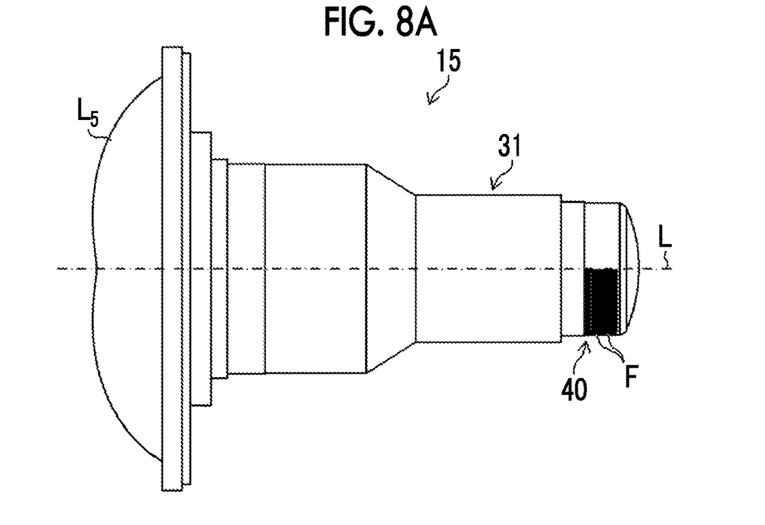
FIGS. 8A and 8B are explanatory views illustrating a surface area enlargement portion as a heat release structure formed in the lens barrel.
Figure 8B:
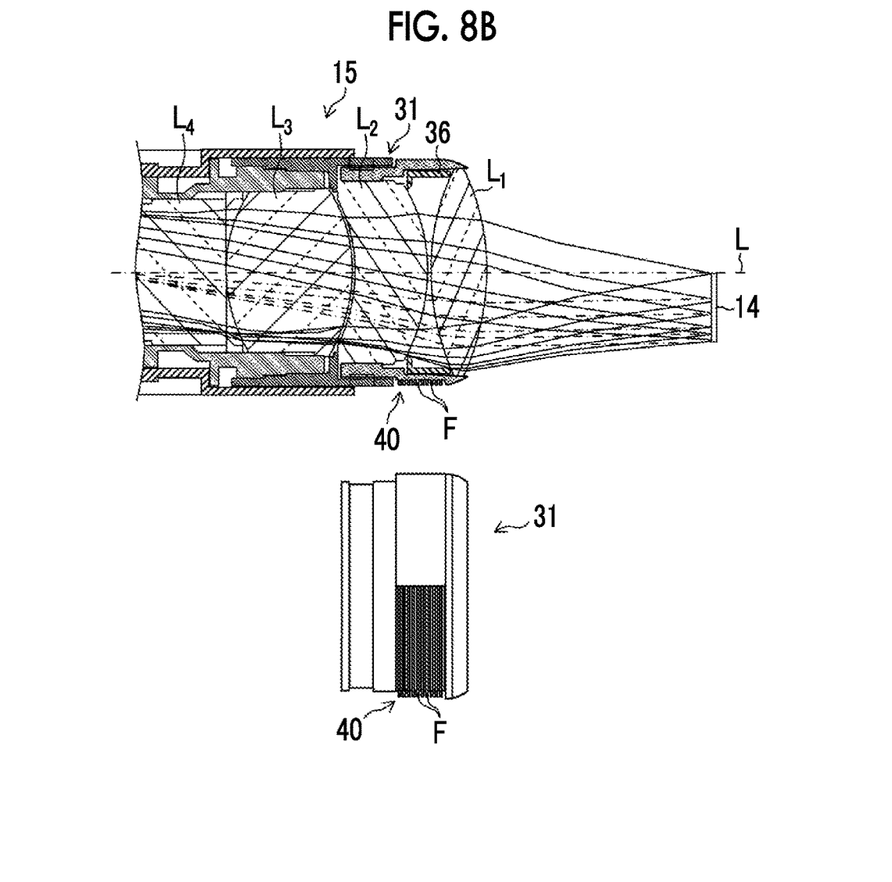

FIGS. 8A and 8B show a case where a surface area enlargement portion 40 formed in the lens barrel 31 is used as a heat release structure, FIG. 8A is an appearance diagram of the entire lens barrel 31 of the projection lens 15, and FIG. 8B is a diagram showing the positional relationship between the surface area enlargement portion 40 and a lens.

Although the surface area enlargement portion 40 will be described with an example of a plurality of fins F, the surface area enlargement portion 40 is not limited to the fins F, and a plurality of protrusions, a plurality of dimples, or the like may be formed. Any number of fins F may be formed as long as heat of a lens or heat of a lens support member can be released, and one fin may be formed.

As shown in FIG. 8B, a metal ring 36 is provided as a spacer between the lenses $L_1$ and $L_2$, and a plurality of fins F are formed in a portion of the lens barrel 31 in the direction, in which the image forming panel 14 is shifted, near the metal ring 36.

With this, heat of the lower portions of the lenses $L_1$ and $L_2$ where the passage amount of light is large and there is a large increase in temperature is easily released through the fins F, and heat of the upper portions of the lenses $L_1$ and $L_2$ where the passage amount of light is small and there is a small increase in temperature is hardly released. As a result, since the difference in temperature between the lower portions and the upper portions of the lenses $L_1$ and $L_2$ is further reduced, it is possible to prevent inclination or displacement of the projection lens 15, and to suppress degradation of quality of an image to be projected.

Since the heat release ability of the surface area enlargement portion 40 is proportional to the size of a surface area, it is preferable that the relationship between the number of fins F and the heat release ability is calculated in advance by a preliminary test or the like.

Though not shown, a heat release material provided in the lens barrel 31 may be employed as a heat release structure. For example, heat release rubber, a heat release coating material, heat release ceramics, or the like can be used as the heat release material.

For example, the portion of the heat release structure of FIGS. 8A and 8B is formed of heat release rubber or heat release ceramics or is coated with a heat release coating material, thereby forming a heat release structure using a heat release material. In this case, it is more preferable that the surface area enlargement portion 40 (for example, the fins F) and the heat release material are combined.

Though not shown, a heat sink structure provided in the lens barrel 31 may be employed as a heat release structure. The heat sink structure is a heat sink using a material having high thermal conductivity, such as aluminum or copper, and heat of a lens portion increased in temperature can be released outside the lens barrel through the heat sink structure. For this reason, the difference in temperature between the upper side and the lower side of the projection lens hardly occurs.

In the first embodiment, although the position of the lens barrel 31 where the heat release structure is formed has been described with an example of a corresponding portion of the lens barrel 31 near the metal ring 36, the invention is not limited thereto. The forming position of the heat release structure may be a lens barrel portion in the direction, in which the image forming panel 14 is shifted, on the image forming panel 14 from the diaphragm position 32 where the F-Number of the projection lens 15 is determined. For example, if the heat release structure is formed at a position of a lens having the greatest influence on degradation of performance with the difference in temperature between the upper side and the lower side of the lens, it is possible to more effectively suppress degradation of quality of an image to be projected.

[Second Embodiment of Projector of the Invention]

A second embodiment of a projector 10 of the invention has a configuration in which, in addition to the heat release structure described in the first embodiment, a counterpart heat release structure is formed in a portion of the lens barrel 31 in a direction opposite to a direction, in which the image forming panel 14 is shifted, and the heat release structure has higher heat release efficiency than that of the counterpart heat release structure. Other configurations of the projector 10 are the same as those in the first embodiment, and description of other configurations will not be repeated.

Figure 9A:
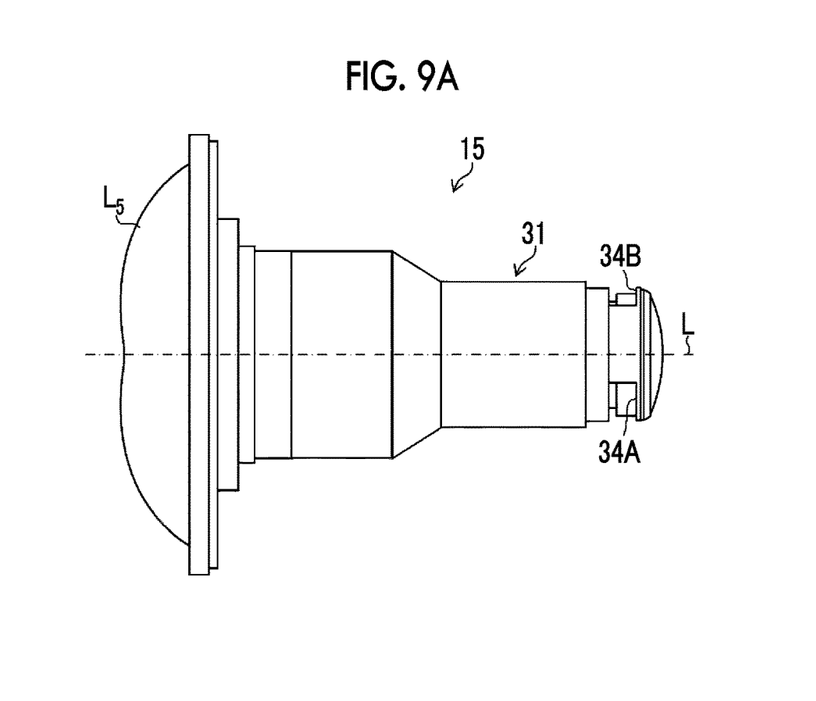
FIGS. 9A and 9B are explanatory views illustrating openings as a heat release structure and a counterpart heat release structure formed in a lens barrel in a second embodiment.
Figure 9B:
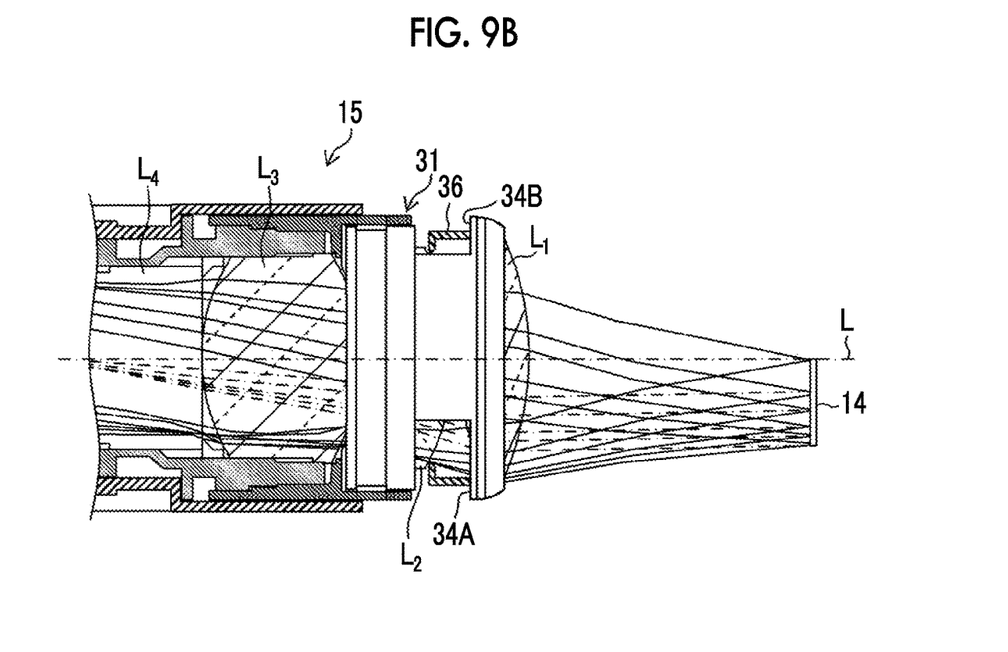

FIGS. 9A and 9B show a case where openings formed in the lens barrel are used as a heat release structure and a counterpart heat release structure, FIG. 9A is an appearance diagram of the entire lens barrel of the projection lens, and FIG. 9B is a diagram showing the positional relationship between the heat release structure and the counterpart heat release structure, and a lens.

As shown in FIG. 9B, a metal ring 36 is provided as a spacer between the lenses $L_1$ and $L_2$, a first opening 34A (heat release structure) is formed in a portion of the lens barrel 31 in a direction, in which the image forming panel 14 is shifted, near the metal ring 36, and a second opening 34B (counterpart heat release structure) is formed in a portion of the lens barrel 31 in a direction opposite to the direction, in which the image forming panel 14 is shifted.

That is, in the corresponding portion of the lens barrel 31 near the metal ring 36, first opening 34A is formed so as to face the lower portions of the lenses $L_1$ and $L_2$, and the second opening 34B is formed so as to face the upper portions of the lenses $L_1$ and $L_2$. A structure is made in which the opening area of the first opening 34A is greater than the opening area of the second opening 34B, and the first opening 34A (heat release structure) has higher heat release efficiency than that of the second opening 34B (counterpart heat release structure).

With this, heat of the lower portions of the lenses $L_1$ and $L_2$ where the passage amount of light is large and there is a large increase in temperature is released through the first opening 34A with a large heat release amount, and heat of the upper portions of the lenses $L_1$ and $L_2$ where the passage amount of light is small and there is a small increase in temperature is released through the second opening 34B with a small heat release amount.

As a result, since the difference in temperature between the lower portions and the upper portions of the lenses $L_1$ and $L_2$ is further reduced, it is possible to prevent inclination or displacement of the projection lens 15, and to suppress degradation of quality of an image to be projected. The first opening 34A and the second opening 34B are provided, whereby, since it is possible to suppress an increase in temperature of the entire lenses $L_1$ and $L_2$, it is possible to more reliably suppress degradation of quality of an image to be projected.

Figure 10A:
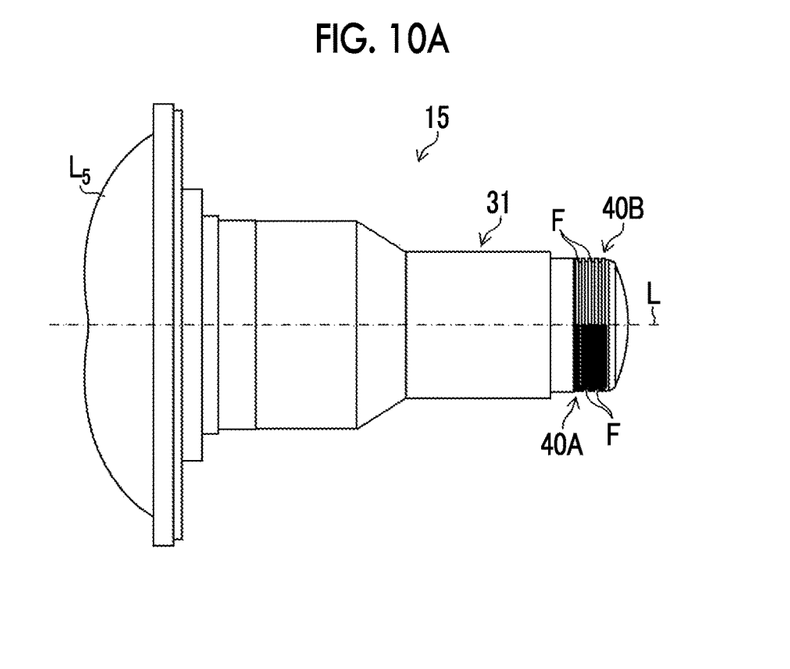
FIGS. 10A and 10B are explanatory views illustrating surface area enlargement portions as a heat release structure and a counterpart heat release structure formed in the lens barrel in the second embodiment.
Figure 10B:
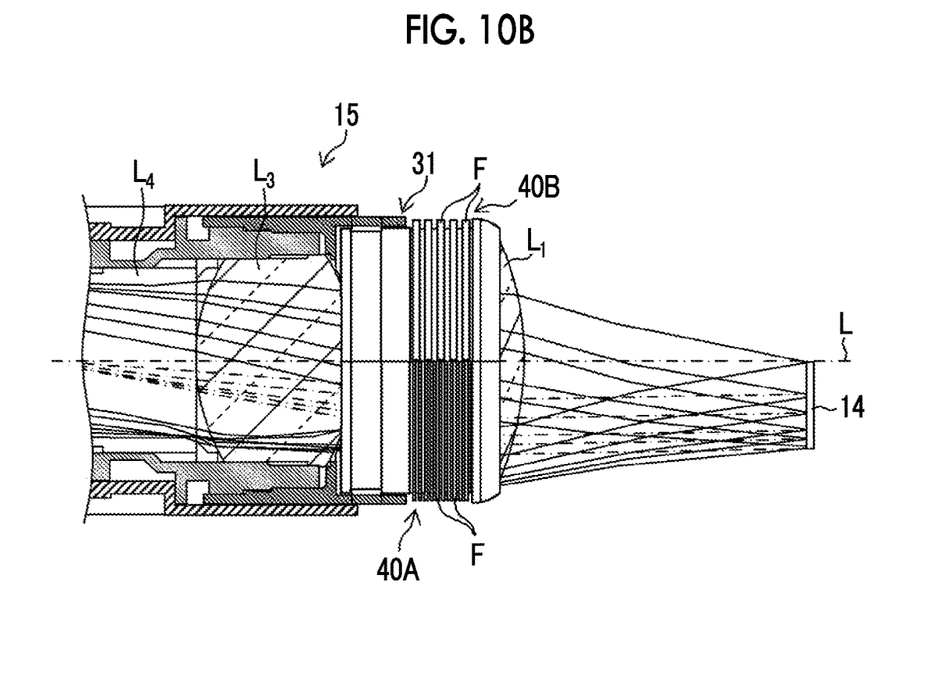

FIGS. 10A and 10B show a case where surface area enlargement portions formed in the lens barrel are used as a heat release structure and a counterpart heat release structure, FIG. 10A is an appearance diagram of the entire lens barrel 31 of the projection lens 15, and FIG. 10B is a diagram showing the positional relationship between a heat release structure and a counterpart heat release structure, and a lens. Although the surface area enlargement portions have been described with an example of the fins, the protrusions or dimples described above may be used.

As shown in FIG. 10B, a metal ring 36 is provided as a spacer between the lenses $L_1$ and $L_2$, a first surface area enlargement portion 40A (heat release structure) is formed in a portion of the lens barrel 31 in a direction, in which the image forming panel 14 is shifted, near the metal ring 36, and a second surface area enlargement portion 40B (counterpart heat release structure) is formed in a portion of the lens barrel 31 in a direction opposite to the direction, in which the image forming panel 14 is shifted.

That is, in the corresponding portion of the lens barrel 31 near the metal ring 36, first surface area enlargement portion 40A is formed corresponding to the lower portions of the lenses $L_1$ and $L_2$, and the second surface area enlargement portion 40B is formed corresponding to the upper portions of the lenses $L_1$ and $L_2$. A structure is made in which the surface area of the first surface area enlargement portion 40A is greater than the surface area of the second surface area enlargement portion 40B, and the first surface area enlargement portion 40A (heat release structure) has higher heat release efficiency than that of the second surface area enlargement portion 40B (counterpart heat release structure).

With this, heat of the lower portions of the lenses $L_1$ and $L_2$ where the passage amount of light is large and there is a large increase in temperature is released through the first surface area enlargement portion 40A with a large heat release amount, and heat of the upper portions of the lenses $L_1$ and $L_2$ where the passage amount of light is small and there is a small increase in temperature is released through the second surface area enlargement portion 40B with a small heat release amount.

As a result, since the difference in temperature between the lower portions and the upper portions of the lenses $L_1$ and $L_2$ is further reduced, it is possible to prevent inclination or displacement of the projection lens 15, and to suppress degradation of quality of an image to be projected. The first surface area enlargement portion 40A and the second surface area enlargement portion 40B are provided, whereby, since it is possible to suppress an increase in temperature of the entire lenses $L_1$ and $L_2$, it is possible to more reliably suppress degradation of quality of an image to be projected.

Figure 11:
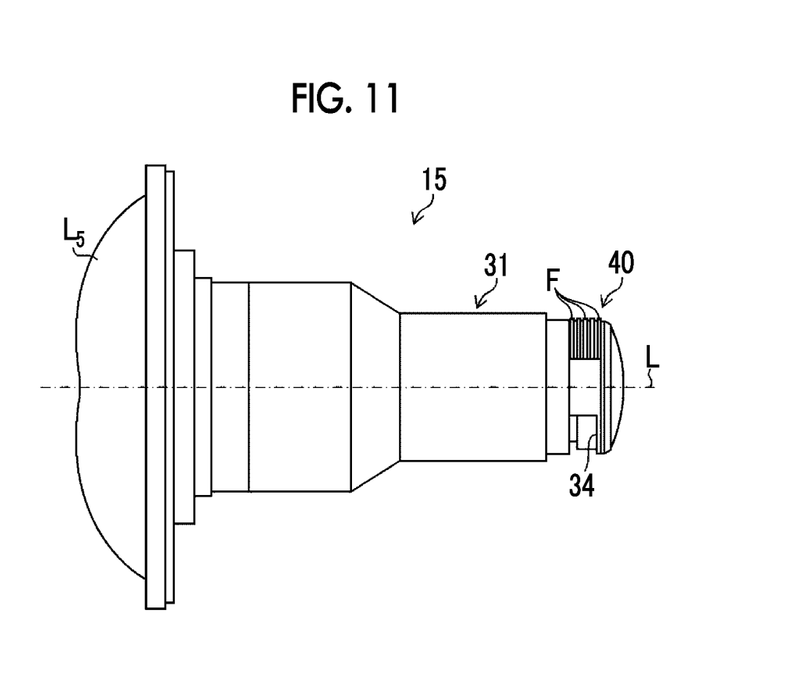
FIG. 11 is an explanatory view illustrating an opening as a heat release structure and a surface area enlargement portion as a counterpart heat release structure formed in the lens barrel in the second embodiment.

FIG. 11 is a modification example of the second embodiment, and shows a case where the opening 34 formed in the lens barrel 31 is used as a heat release structure, and the surface area enlargement portion 40 formed in the lens barrel 31 is used as a counterpart heat release structure. FIG. 11 is an appearance diagram of the entire lens barrel 31 of the projection lens 15. In FIG. 11, although a diagram showing the positional relationship between the heat release structure and the counterpart heat release structure, and a lens is not used, as in FIGS. 9A and 9B, and 10A and 10B, the heat release structure and the counterpart heat release structure are formed near a metal ring 36 provided as a spacer between the lenses $L_1$ and $L_2$.

That is, in the corresponding portion of the lens barrel 31 near the metal ring 36, the opening 34 is formed so as to face the lower portions of the lenses $L_1$ and $L_2$, and the surface area enlargement portion 40 is formed corresponding to the upper portions of the lenses $L_1$ and $L_2$. The opening 34 (heat release structure) is formed to have greater heat release ability than that of the surface area enlargement portion 40 (counterpart heat release structure).

With this, heat of the lower portions of the lenses $L_1$ and $L_2$ where the passage amount of light is large and there is a large increase in temperature is released through the opening 34 with a large heat release amount, and heat of the upper portions of the lenses $L_1$ and $L_2$ where the passage amount of light is small and there is a small increase in temperature is released through the surface area enlargement portion 40 with a small heat release amount.

As a result, since the difference in temperature between the lower portions and the upper portions of the lenses $L_1$ and $L_2$ is further reduced, it is possible to prevent inclination or displacement of the projection lens 15, an to suppress degradation of quality of an image to be projected. The opening 34 and the surface area enlargement portion 40 are provided, whereby, since it is possible to suppress an increase in temperature of the entire lenses $L_1$ and $L_2$, it is possible to more reliably suppress degradation of quality of an image to be projected.

In FIGS. 9A to 11, although a combination of openings having different opening areas, a combination of surface area enlargement portions having different surface areas, and a combination of an opening and a surface area enlargement portion have been described as a combination of a heat release structure and a counterpart heat release structure, the invention is not limited thereto. An opening, a surface area enlargement portion, a heat release material, and a heat sink structure may be combined.

In the second embodiment, although the positions of the lens barrel 31 where the heat release structure and the counterpart heat release structure are formed have been described with an example of the corresponding portion of the lens barrel 31 near the metal ring 36, the invention is not limited thereto. The heat release structure may be formed in a portion of the lens barrel 31 in a direction, in which the image forming panel 14 is shifted, on the image forming panel 14 side from the diaphragm position 32 where the F-Number of the projection lens 15 is determined, and the counterpart heat release structure may be formed in a portion of the lens barrel 31 in a direction opposite to the direction, in which the image forming panel 14 is shifted. For example, if the heat release structure and the counterpart heat release structure are formed at the position of a lens having the greatest influence on gradation of performance with the difference in temperature between the upper side and the lower side of the lens, it is possible to more effectively suppress degradation of quality of an image to be projected.

EXPLANATION OF REFERENCES

10: projector, 11: housing, 13: light source device, 14: image forming panel, 15: projection lens, 17: control device, 18: image forming surface, 20: screen, 21: zoom dial, 22: light amount adjustment dial, 23: focus dial, 24: up/down pint adjustment dial (tilt-and-shift operating member), 25: right/left pint adjustment dial (tilt-and-shift operating member), 26: screen correction dial (screen shape correction member), 31: lens barrel, 32: diaphragm position, 34: opening, 34A: first opening, 34B: second opening, 36: metal ring, 38: opening area adjustment mechanism, 40: surface area enlargement . . . surface area enlargement portion, 40A: first surface area enlargement portion, 40B: second surface area enlargement portion, A: aperture diaphragm, L: optical axis

What is claimed is:
1. A projector comprising:
an image forming panel on which an image is formed; and
a projection lens which projects the image of the image forming panel on a projection surface,
wherein the center of the image forming panel is fixed with being shifted with respect to an optical axis of the projection lens, and a central position of the projected image of the image forming panel is deviated in a direction opposite to a direction in which the center of the image forming panel is shifted, and
a lens barrel of the projection lens has a heat release structure which is formed in a lens barrel portion in the direction, in which the image forming panel is shifted, on the image forming panel side from a diaphragm position where an F-Number of the projection lens is determined.
2. The projector according to claim 1,
wherein the heat release structure is an opening formed in the lens barrel.
3. The projector according to claim 2,
wherein the opening has an opening area adjustment mechanism capable of adjusting an opening area.
4. The projector according to claim 1,
wherein the heat release structure is a surface area enlargement portion formed in the lens barrel.
5. The projector according to claim 4,
wherein the surface area enlargement portion has at least one fin.
6. The projector according to claim 1,
wherein the heat release structure is a heat release material provided in the lens barrel.
7. The projector according to claim 1,
wherein the heat release structure is a heat sink structure.
8. The projector according to claim 1,
wherein the heat release structure is formed in the lens barrel portion corresponding to a position of a lens having the greatest influence on degradation of lens performance due to the difference in temperature between a direction, in which the center of the image forming panel is shifted, and a direction opposite to the direction, in which the center of the image forming panel is shifted, on the image forming panel side from the diaphragm position where the F-Number is determined, among a plurality of lenses constituting the projection lens.
9. The projector according to claim 2,
wherein the heat release structure is formed in the lens barrel portion corresponding to a position of a lens having the greatest influence on degradation of lens performance due to the difference in temperature between a direction, in which the center of the image forming panel is shifted, and a direction opposite to the direction, in which the center of the image forming panel is shifted, on the image forming panel side from the diaphragm position where the F-Number is determined, among a plurality of lenses constituting the projection lens.
10. The projector according to claim 4,
wherein the heat release structure is formed in the lens barrel portion corresponding to a position of a lens having the greatest influence on degradation of lens performance due to the difference in temperature between a direction, in which the center of the image forming panel is shifted, and a direction opposite to the direction, in which the center of the image forming panel is shifted, on the image forming panel side from the diaphragm position where the F-Number is determined, among a plurality of lenses constituting the projection lens.
11. The projector according to claim 7,
wherein the heat release structure is formed in the lens barrel portion corresponding to a position of a lens having the greatest influence on degradation of lens performance due to the difference in temperature between a direction, in which the center of the image forming panel is shifted, and a direction opposite to the direction, in which the center of the image forming panel is shifted, on the image forming panel side from the diaphragm position where the F-Number is determined, among a plurality of lenses constituting the projection lens.
12. The projector according to claim 1,
wherein a metal ring is used as a spacer between lenses on the image forming panel side from the diaphragm position where the F-Number is determined, and the heat release structure is formed in the corresponding lens barrel portion near the metal ring.

13. The projector according to claim 4, wherein a metal ring is used as a spacer between lenses on the image forming panel side from the diaphragm position where the F-Number is determined, and the heat release structure is formed in the corresponding lens barrel portion near the metal ring.

14. The projector according to claim 10, wherein the metal ring and the surface area enlargement portion are in surface contact with each other so as to release heat of the metal ring in the surface area enlargement portion.

15. The projector according to claim 1, wherein the amount S of shifting the image forming panel is $0.4 \leq S \leq 0.7$.

16. The projector according to claim 2, wherein the amount S of shifting the image forming panel is $0.4 \leq S \leq 0.7$.

17. The projector according to claim 4, wherein the amount S of shifting the image forming panel is $0.4 \leq S \leq 0.7$.

18. The projector according to claim 7, wherein the amount S of shifting the image forming panel is $0.4 \leq S \leq 0.7$.

19. The projector according to claim 1, wherein a counterpart heat release structure is formed in a lens barrel portion in a direction opposite to a direction in which the image forming panel is shifted, in the lens barrel, and the heat release structure is formed in a structure having higher heat release efficiency than that of the counterpart heat release structure.

* * * * *